United States Patent
Hsu et al.

(10) Patent No.: US 9,705,146 B2
(45) Date of Patent: Jul. 11, 2017

(54) METHOD OF FABRICATING PROTON-CONDUCTING ELECTROLYTIC MEMBRANE

(71) Applicant: National Cheng Kung University, Tainan (TW)

(72) Inventors: Steve Lien-Chung Hsu, Tainan (TW); Li-cheng Jheng, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 318 days.

(21) Appl. No.: 14/583,868

(22) Filed: Dec. 29, 2014

(65) Prior Publication Data

US 2016/0190625 A1 Jun. 30, 2016

(51) Int. Cl.
| | | |
|---|---|---|
| H01M 8/10 | (2016.01) | |
| H01M 8/1081 | (2016.01) | |
| H01M 8/103 | (2016.01) | |
| H01M 8/1069 | (2016.01) | |
| H01M 8/1053 | (2016.01) | |
| H01M 8/04082 | (2016.01) | |
| H01M 8/1048 | (2016.01) | |
| H01M 8/1018 | (2016.01) | |

(Continued)

(52) U.S. Cl.
CPC ..... *H01M 8/1081* (2013.01); *H01M 8/04197* (2016.02); *H01M 8/103* (2013.01); *H01M 8/1053* (2013.01); *H01M 8/1079* (2013.01); *H01M 8/1048* (2013.01); *H01M 8/1072* (2013.01); *H01M 8/1088* (2013.01); *H01M 2008/1095* (2013.01); *H01M 2300/0082* (2013.01); *Y02P 70/56* (2015.11)

(58) Field of Classification Search
CPC ........... H01M 8/1081; H01M 8/04197; H01M 8/103; H01M 8/1053; H01M 8/1079; H01M 8/1048; H01M 8/1072; H01M 8/1088
See application file for complete search history.

(56) References Cited

U.S. PATENT DOCUMENTS

| | | | | |
|---|---|---|---|---|
| 2004/0013925 A1* | 1/2004 | Komiya | ................. | C08G 73/10 429/492 |
| 2007/0020507 A1* | 1/2007 | Kim | ....................... | B82Y 30/00 429/483 |
| 2010/0291462 A1* | 11/2010 | Thate | ................. | H01M 4/8814 429/483 |

OTHER PUBLICATIONS

Jheng et al. "A novel asymmetric polybenzimidazole membrane for high temperature proton exchange membrane fuel cells"; J. Mater. Chem. A, 2014, 2, pp. 4225-4233 (first published online on Jan. 7, 2014).*

(Continued)

*Primary Examiner* — Gregg Cantelmo
(74) *Attorney, Agent, or Firm* — Jackson IPG PLLC; Demian K. Jackson (57) ABSTRACT

A method is provided to fabricate an electrolyte membrane. The membrane has an asymmetric structure and is a polybenzimidazole membrane doped with phosphoric acid. The asymmetric structure comprises a dense layer and a porous layer. The content of phosphoric acid introduced into the polybenzimidazole membrane reaches 20 phosphoric acid molecules per polymer repeating unit. The proton conductivity of the polybenzimidazole membrane reaches $5 \times 10^{-2}$ siemens per centimeter (S/cm). An electrode made with the polybenzimidazole membrane can be smoothly operated in a proton exchange membrane fuel cell.

7 Claims, 7 Drawing Sheets (51) Int. Cl.
    *H01M 8/1072*    (2016.01)
    *H01M 8/1088*    (2016.01)

(56) References Cited

OTHER PUBLICATIONS

Wang et al. "Preparation and properties of epoxy-cross-linked porous polybenzimidazole for high temperature proton exchange membrane fuel cells", J. Membrane Science 411-412 (2012), pp. 54-63 (available online Apr. 17, 2012).*
The Fuel Cell Industry Review 2012. www.fuelcelltoday.com.
i.s. Wainright et al., "Acid-Doped Polybenzimidazoles: A New Polymer Electrolyte", J. Electrochem. Soc., vol. 142, No. 7, Jul. 1995, The Electrochemical Society, Inc. pp. L121-L123.
Q. Li et al., "PBI-Based Polymer Membranes for High Temperature Fuel Cells—Preparation, Characterization and Fuel Cell Demonstration", Fuel Cells 2004, 4, No. 3, pp. 147-159.
David Mecerreyes et al., "Porous Polybenzimidazole Membranes Doped with Phosphoric Acid: Highly Proton0Conducting Solid Electrolytes", 2004 American Chemical Society.

* cited by examiner

METHOD OF FABRICATING PROTON-CONDUCTING ELECTROLYTIC MEMBRANE

FIELD OF THE INVENTION

The present invention relates to fabricating an electrolytic membrane; more particularly, relates to fabricating an asymmetric-structure polybenzimidazole membrane doped with phosphoric acid, where the polybenzimidazole membrane is used as an electrolytic membrane of a proton exchange membrane fuel cell (PEMFC), especially a high-temperature PEMFC.

BACKGROUND OF THE INVENTION

Fuel cell is an energy conversion device, which can directly convert chemical energy of hydrogen-rich fuel into electrical energy. Its by-products are almost non-polluting (e.g., water or methanol). Fuel cell has become one of the most noticeable and anticipated generators of clean energy with its high power generation efficiency, low noise, zero carbon footprint, no memory effect and no grid-dependence.

There are many types of fuel cell, all of whose major structural design is two layers of electrode and an electrolyte between the two electrodes. The type and phase (liquid or solid) of the electrolyte depend on the type of the fuel cell. The main function of the electrolyte is to separate the electrodes for preventing internal current conduction and helping conducting protons or hydroxide ions. In general, fuel cell is mainly applied in three fields, including portable power generation, fixed power generation and transportation power generation. Among them, fuel cell is applied in the field of portable power generation the most widely, including consumer electronics, auxiliary power systems, and military equipments.

PEMFC is a type of fuel cell used in the fields of portable power generation and transportation power generation. According to the working temperature, a PEMFC can be a low-temperature one and a high-temperature one. A low-temperature PEMFC is operated at a temperature of 0~100° C.; and, a high-temperature one is 100~200° C. However, the high-temperature one has a number of advantages as compared to the low-temperature one. For example, the poisoning effect of carbon monoxide to the activity of the catalyst can be reduced; the electrochemical reaction kinetics can be enhanced; recombination and purification of fuel can be simplified; extra humidification system is discarded; and thermal management can be simplified because a cooling device is no more required.

According to an industrial review report of Fuel Cell Today 2012, it was noted that, in 2011, world's total electricity generation of fuel cell had come to more than 100 MW; in 2012, even 175.8 MW. Therein, PEMFC accounted for 73.8 MW (approximately 42%). From a volume perspective, in 2012, the total global shipment of fuel cell came to 78.2 thousand pieces, where PEMFC accounted for 70.9 thousand pieces (about 91%). This is because PEMFC is portable, high-powered and modularizable to be widely used on various types of stationary backup powers, transportation equipments and portable electronic products.

An electrolyte membrane used in a high-temperature PEMFC is mainly a solid electrolyte membrane made of a polymer of polybenzimidazole doped with a strong acid. The most suitable strong acid to be doped into polybenzimidazole is phosphoric acid (PA), which is relatively thermal-stable and can form ionic bonding with polybenzimidazole. The general chemical structure of polybenzimidazole is as follows:

It is known that the amount of phosphoric acid contained in an acid-doped polybenzimidazole membrane will significantly affect its proton conductivity (Q. Li et al., Fuel Cells, 2004, 4 volumes, 147-159). To obtain an excellent power generation efficiency of the fuel cell, the electrolyte membrane must have excellent proton conductivity; and the higher the content of phosphoric acid contained, the higher proton conductivity the acid-doped polybenzimidazole membrane have. However, a document (Wainright et al., Journal of The Electrochemical Society, 1995, 142 volumes, L121-L123) reported that a polybenzimidazole membrane doped with phosphoric acid through a general method of being soaked in phosphoric acid can only obtain 5 phosphoric acid molecules/each polymer repeating unit, where this much content of phosphoric acid can not obtain a suitable proton conductivity under an anhydrous environment.

Therefore, in order to substantially increase the content of phosphoric acid introduced into the polybenzimidazole membrane for improving the proton conductivity of the membrane, there are currently two technical methods can be employed. A first method is to use a so-called sol-gel process to fabricate the acid-doped polybenzimidazole membrane. The sol-gel process uses polyphosphoric acid as a solvent to synthesize a polybenzimidazole. After completion of the synthesis reaction without precipitating the polymer, the reaction solution is directly processed through a membrane-gelling process. In the gelling process, the solvent of polyphosphoric acid absorbs moisture (gas) to be directly hydrolyzed into phosphoric acid so that the polybenzimidazole membrane can obtain phosphoric acid without processing soaking. This method can be found in US Patent US20070193885. The membrane fabricated through this method can have a phosphoric acid content at least 20 phosphoric acid molecules per polymer repeating unit and a proton conductivity more than $10^{-1}$ siemens per centimeter (S/cm). The second method is to fabricate a porous-structure polybenzimidazole membrane. Patent US20040058216, U.S. Pat. No. 6,187,231, U.S. Pat. No. 6,602,630 and US20120000852 describe methods for fabricating a porous-structure polybenzimidazole membrane. A document (D. Mecerreyes et al, Chemistry of Materials, 2004, 16 volumes, 604-607) also confirmed that the porous structure can make more phosphoric acid be doped into polybenzimidazole through a general soaking way due to its capillary action, where the phosphoric acid content contained can reach at least 10 phosphoric acid molecules per polymer repeating unit and the proton conductivity can reach more than $5 \times 10^{-2}$ S/cm siemens per centimeter (S/cm).

The above two methods for fabricating a phosphoric-acid-doped polybenzimidazole membrane with high phosphoric acid content still have some problems to be improved. For example, the phosphoric-acid-doped polybenzimidazole membrane fabricated through the sol-gel process must accurately grasp the process of polyphosphoric acid absorbance and hydrolysis, while the molecular weight of polybenzimidazole must be very high. If they are not both matched, it is not possible to fabricate a uniform membrane.

Regarding a porous-structure polybenzimidazole membrane, a higher porosity makes a higher content of phosphoric acid introduced, where, however, it may be accompanied with weakened mechanical strength and reduced oxidative stability. On being applied to a PEMFC, the electrolyte membrane along with two gas diffusion electrodes (GDE) is made into a sandwich-structure membrane electrode assembly (MEA) through hot-pressing. Then, units of membrane electrodes are linked together in a parallel way to form a battery pack. Therefore, the electrolyte membrane must have a certain mechanical strength to avoid breakage on being handled and assembled into modules during the hot-pressing process. Because the fuel at cathode of fuel cell is oxygen, there are chances of generating peroxy radicals, which attack the electrolyte membrane and make it decomposed. Therefore, the electrolyte membrane must consider the stability of oxidative cleavage of its material. Furthermore, the electrolyte membrane not only has to have good ionic conductivity and electrical insulation, but also needs to avoid fuel crossover. However, when the porosity of the membrane reaches a certain level, individual pores will be in communication, which results in a connective porous structure. Such a structure may make the gaseous fuels at anode and cathode mutually cross to the opposite side to cause a substantial decline in the voltage of the fuel cell without achieving the desired power density generated by the fuel cell. Meanwhile, at the interface between the electrolyte membrane and the gas diffusion electrode at the cathode side in the fuel cell, an electrochemical reaction of oxygen dissociation along with proton combined for forming water may occurs and the water generated at the interface may easily drag out phosphoric acid adhered in the porous structure to cause acid leakage. As a result, the phosphoric acid content of the electrolyte membrane is reduced along with the proton conductivity decreased, and the power generation efficiency of the fuel cell is further affected.

On applying the porous-structure polybenzimidazole membrane as an electrolyte membrane in a fuel cell, the problems of mechanical strength and insufficient oxidative-cleavage stability can be effectively improved through a procedure of chemical or physical crosslinking. However, regarding the issues of fuel crossover and acid leakage causing serious adverse effects on power generation efficiency of the fuel cell, problems are still not solved.

SUMMARY OF THE INVENTION

The main purpose of the present invention is to provide an electrolyte membrane made of a phosphoric-acid-doped asymmetric-structure polybenzimidazole membrane, where the polybenzimidazole membrane has a phosphoric-acid content more than 20 phosphoric acid molecules per polymer repeating unit and a proton conductivity more than $5 \times 10^{-2}$ siemens per centimeter (S/cm); and the membrane electrode made with the polybenzimidazole membrane can smoothly work in the PEMFC To achieve the above purpose, the present invention is a method of fabricating a proton-conducting electrolytic membrane comprising steps of: (a) through a template-leaching method, using an ionic liquid as a template to be mixed with a polybenzimidazole solution to form an asymmetric-structure polybenzimidazole membrane after leaching out a porous layer, where the ionic liquid and the polybenzimidazole solution are immiscible; and (b) through being soaked in a phosphoric acid, introducing phosphoric acid into the polybenzimidazole membrane to obtain a proton-conducting electrolytic membrane.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1A to FIG. 6, which are views showing the improvement on preventing fuel crossover and acid leakage by using the present invention; a flow view showing a preferred embodiment according to the present invention; an explosive view showing a PEMFC; a flow view showing specimens photographed by a reflection-type electron microscope; a view showing proton conductivities of the specimens under different temperatures in an anhydrous environment; and a view showing Tafel test results of a fuel cell using the specimens. As shown in the figures, the present invention is a method of fabricating a proton-conducting electrolytic membrane, where an asymmetric-structure polybenzimidazole membrane is fabricated to be doped with phosphoric acid to be used as an electrolyte membrane in a high-temperature PEMFC. The asymmetric structure of the membrane is a structure opposed to isotropic porous structure and nonporous dense structure. The asymmetric structure of the phosphoric-acid-doped polybenzimidazole membrane 1 comprises a dense layer 11 and a porous layer 12. The dense layer 11 and the porous layer 12 have the same main material as polybenzimidazole. In FIG. 1B, the dense layer 11 reduces permeability of gas fuel. When the dense layer 11 faces a cathode of a PEMFC and the porous layer 12 faces an anode of the PEMFC, the dense layer 11 further hinders phosphoric acid from leakage which is carried out by water. Thus, the problems of the prior arts (e.g., FIG. 1A, a polybenzimidazole membrane having an isotropic porous structure) regarding fuel crossover and acid leakage are solved to enhance the reliability of the fuel cell.

On using the present invention, a method of template leaching is used. An ionic liquid is used as a template to be dissolved in a polybenzimidazole solution. After the solvent is removed by volatilization and the ionic liquid is removed by extraction, an asymmetric-structure polybenzimidazole membrane is formed. Then, after introducing phosphoric acid through doping by a soaking method, an asymmetric-structure polybenzimidazole membrane doped with phosphoric acid is obtained. Therein, the asymmetric-structure polybenzimidazole membrane has a phosphoric-acid content more than 20 phosphoric acid molecules per polymer repeating unit and a proton conductivity more than $5 \times 10^{-2}$ S/cm. After hot-pressing, a sandwich-structure membrane electrode can be smoothly fabricated with the phosphoric-acid-doped asymmetric-structure polybenzimidazole membrane and gas diffusion electrodes to be used in a high-temperature PEMFC. Therein, the gas diffusion electrode is a carbon substrate coated with a catalyst on surface and the carbon substrate has a hydrophobic microporous layer. Thus, the membrane electrode made with the phosphoric-acid-doped asymmetric-structure polybenzimidazole membrane can smoothly work in the PEMFC.

Figure 1A:
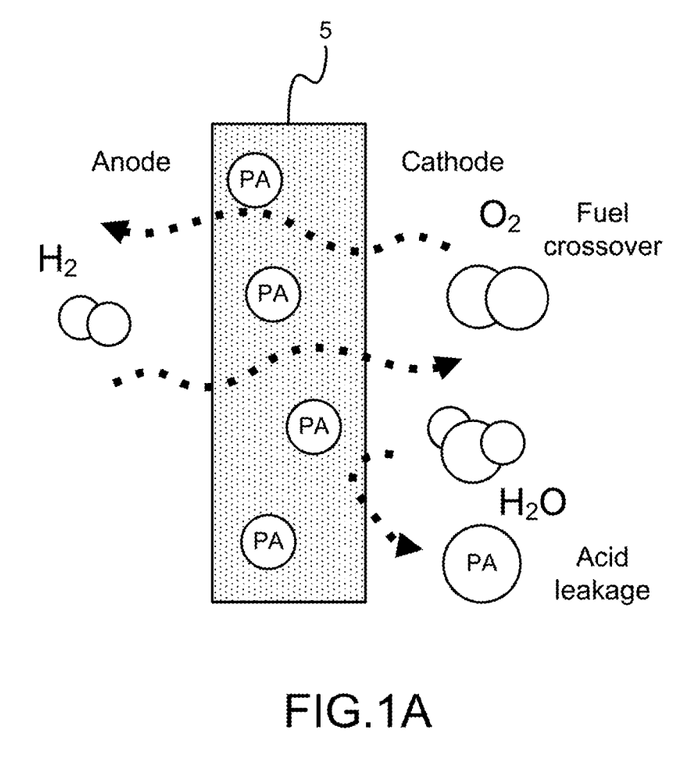
FIG. 1A and FIG. 1B are the views showing the improvement on preventing fuel crossover and acid leakage by using the present invention.
Figure 1B:
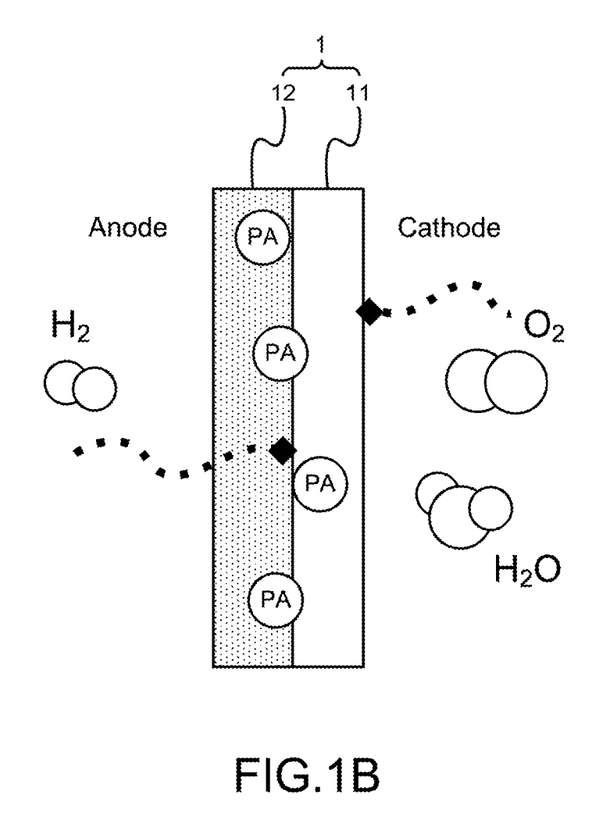
Figure 2:
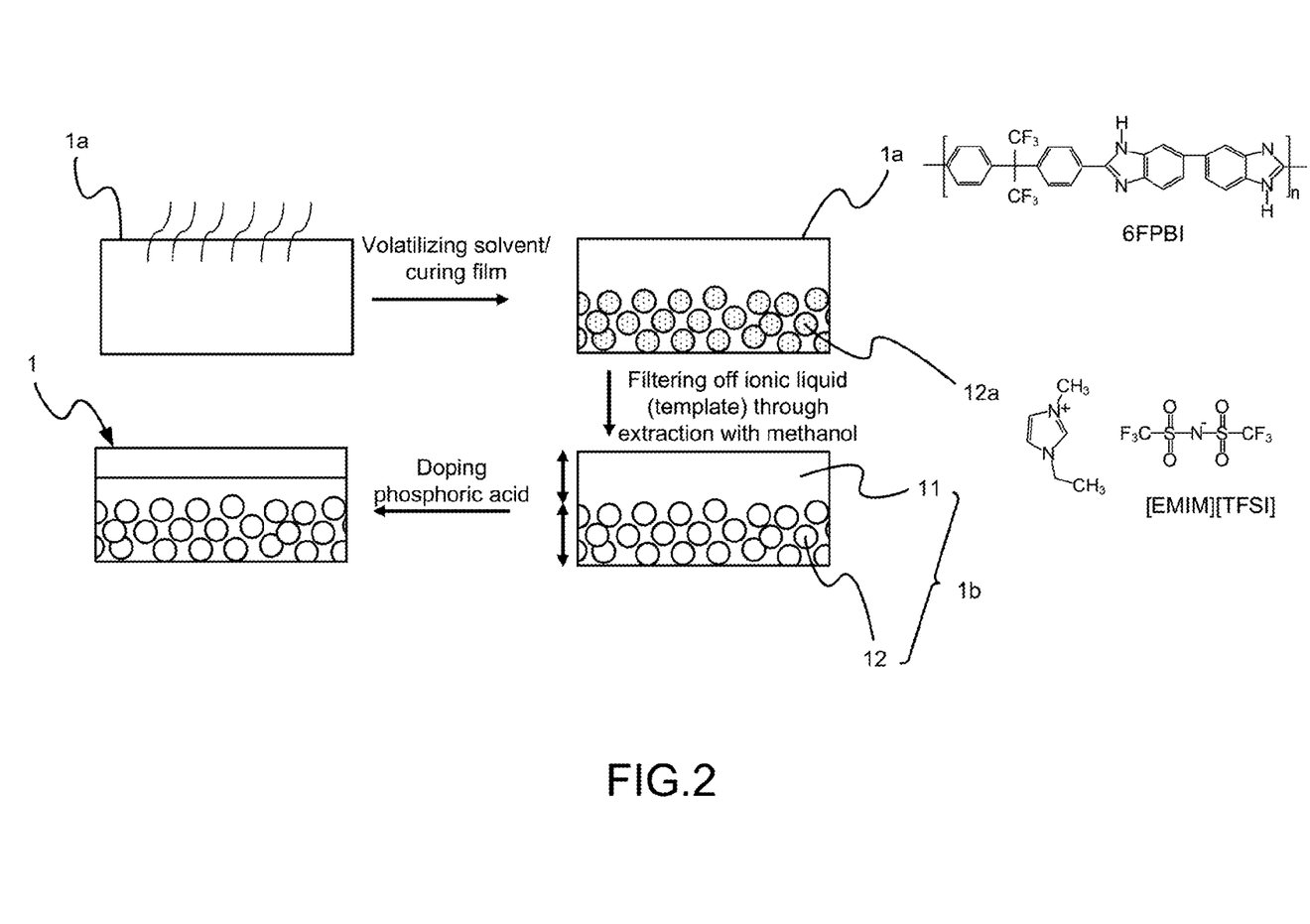
FIG. 2 is the flow view showing the preferred embodiment according to the present invention.

The following description includes the flow of the present invention shown in FIG. 2 and comparisons to prior arts:

A. Synthesizing Polybenzimidazole

Polybenzimidazole is obtained through condensation polymerization with a di-acid and a tetra-amine. The present invention fabricates polybenzimidazole through condensation polymerization with a di-acid of 2,2-Bis(4-carboxyphenyl)-hexafluoroproane and a tetra-amine of 3,3-Diaminobenzidine both dissolved in polyphosphoric acid. The reaction is operated under a nitrogen atmosphere at a temperature of 160~240° C. with stirring for 48~72 hours. After the reaction ends, the product is precipitated in a great amount of deionized water and the reaction solvent, the polyphosphoric acid, is removed. After being collected, the product is processed through alkaline cleaning with an alkaline aqueous solution of sodium hydroxide. After the alkaline cleaning, a great amount of deionized water is used for repeated washes until the product presents a neutral pH. At last, the product is placed in an oven to be hot-dried to obtain polybenzimidazole 1a (6FPBI).

B. Fabricating Asymmetric-Structure Polybenzimidazole Membrane

At first, the previously fabricated polybenzimidazole 1a is dissolved in an organic solvent to be formulated into a solution A having a solid content of 1~10 wt %, where 4~8 wt % is preferred. The organic solvent can be DMAc, DMSO, NMP, DMF, m-cresol, or the like. Then, an ionic liquid 12a having a specific content ratio is added to the solution of the polybenzimidazole to obtain a solution B. Therein, the content of the ionic liquid is 0.5~10 times to the solid content of the polybenzimidazole, where 1~3 times is preferred. The ionic liquid 12a used is a liquid salt compound containing imidazolium and can be completely dissolved in the organic solvent but not the polybenzimidazole. The present invention uses 1-ethyl-3-methylimidazolium bis(trifluoromethylsulfonyl) imide ([EMIM] [TFSI]) as the ionic liquid 12a. Then, the solution B is heated to be volatilized for obtaining a membrane through solidification. Then, the membrane is soaked in a methanol solution for at least one hour. After the ionic liquid used as template is completely filtered off through extraction, a hot-drying process is used to remove the methanol solvent for obtaining an asymmetric-structure asymmetric-structure polybenzimidazole membrane 1b comprising a dense layer 11 and a porous layer 12.

C. Fabricating Phosphoric-Acid-Doped Asymmetric-Structure Polybenzimidazole Membrane The previously fabricated asymmetric-structure asymmetric-structure polybenzimidazole membrane 1b is soaked in a high-concentration phosphoric acid at a specific temperature. The soaking time is from half an hour to several days depending on when the phosphoric acid content of the membrane reaches the saturation level. In general, a high temperature shortens the time for reaching the saturation level; yet, the temperature should not exceed 160° C. An over-high temperature can cause deterioration of phosphoric acid. The temperature of the present invention is set to 90° C. for soaking about one hour under the concentration of phosphoric acid at 14 molars (M). After soaking, excess phosphoric acid on surface of the membrane is wiped off with a gettering paper. Then, the membrane is placed in an oven to remove excess water for obtaining a phosphoric-acid-doped asymmetric-structure polybenzimidazole membrane.

The phosphoric acid content of the electrolyte membrane can be expressed by a phosphoric acid doping level $\chi$, and the phosphoric acid doping level can be decided by weighing and measuring with the following formula. In the formula, $W_d$ is the weight of phosphoric acid doped in the membrane; $W_o$ is the original weight of the membrane (i.e. the weight of the membrane before being doped with phosphoric acid); $M_p$ is the molecular weight of phosphoric acid; and $M_{PBI}$ is the molecular weight of polymer repeating unit of the membrane. The unit of $\chi$ is n phosphoric acid molecules per polymer repeating unit. The formula is as follows:

$$\chi = \frac{(W_d - W_0)/M_p}{W_0/M_{PBI}}$$

The proton conductivity of the electrolyte membrane is measured by an AC impedance analyzer, Autolab PGSTST 30/Metrohm. Test vehicles are two probes under a test frequency range of $10^2 \sim 10^5$ Hz, a test potential of 10 mV, and a test temperature of 90~160° C. The AC impedance analyzer is used to measure $R_\Omega$ to be substituted into the following equation for calculating the proton conductivity $\sigma$. In the formula, l is the membrane thickness; and A is the contact area between the membrane and the test electrode.

$$\sigma = \frac{l}{A} \frac{1}{R_\Omega}$$

D. Fabricating Membrane Electrode

Figure 3:
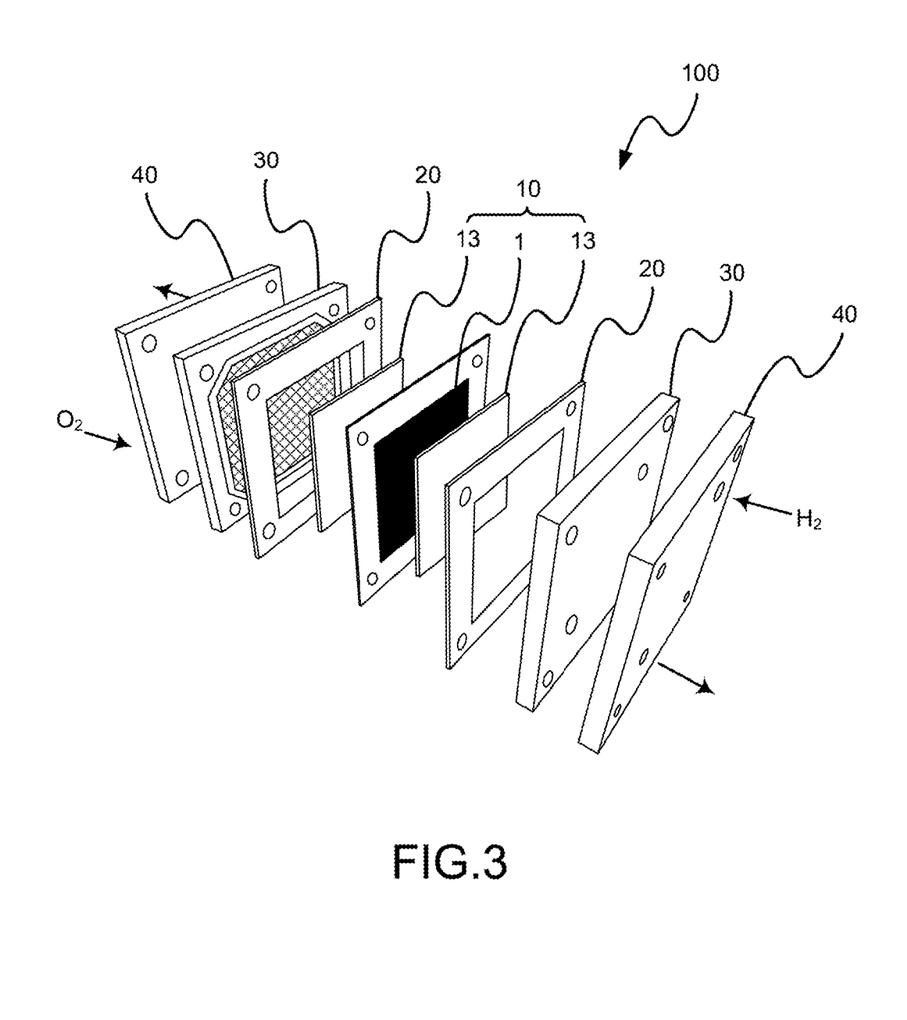
FIG. 3 is the explosive view showing the proton exchange membrane fuel cell (PEMFC)
Figure 4:
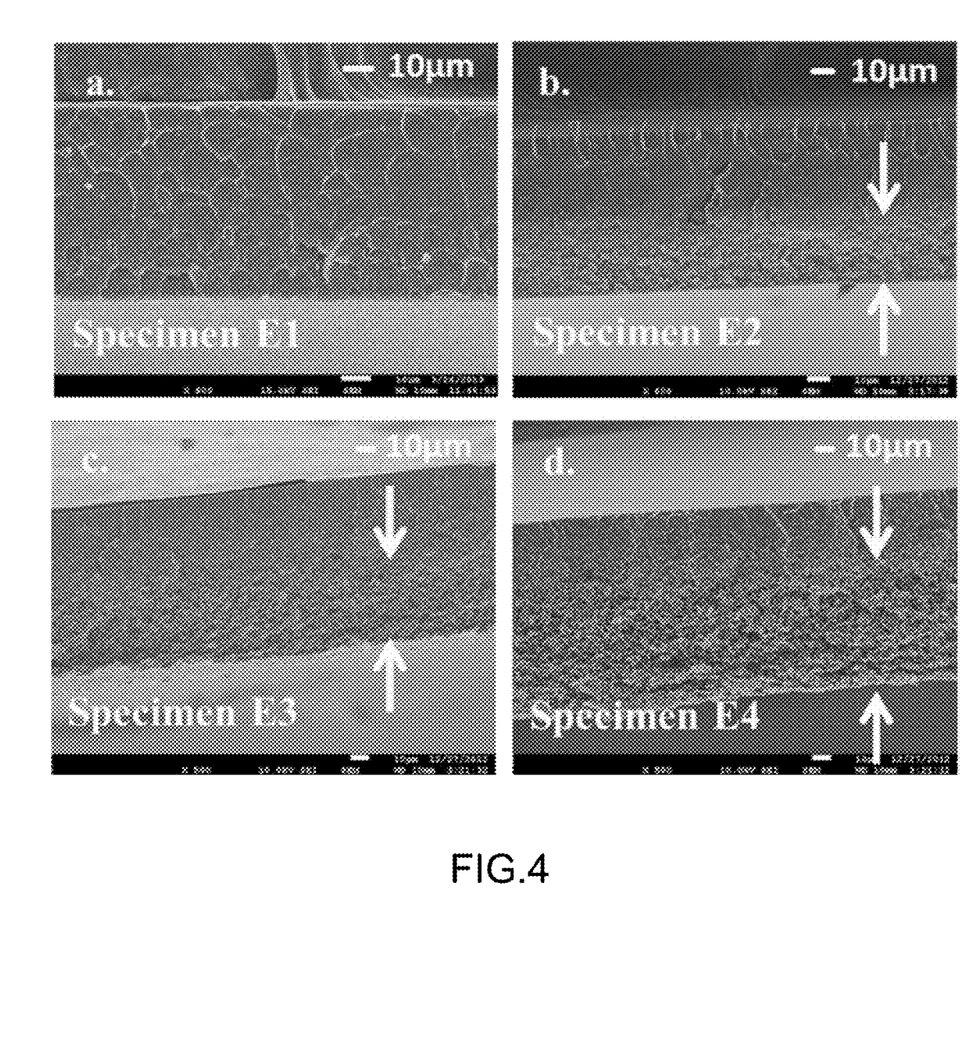
FIG. 4 is the flow view showing the specimens photographed by the reflection-type electron microscope.

At first, a catalyst solution is obtained, which consists of carbon-supported platinum catalyst (Pt/C on Vulcan XC-72, E-TEK), polybenzimidazole and dimethylacetamide (DMAc). The platinum content of the carbon-supported platinum catalyst is 20 wt %. The weight ratio of the carbon-supported platinum catalyst to polybenzimidazole is fixed at 9. An ultrasound oscillator is used to disperse the catalyst solution for avoiding aggregation of the carbon-supported platinum catalyst. Subsequently, a carbon substrate having a hydrophobic microporous layer (24BC, SGL Group) is used as a gas diffusion layer with the dispersed catalyst solution sprayed on the gas diffusion layer. Then, after a heating plate is used for heating to remove the DMAc solvent, a gas diffusion electrode 13 (as shown in FIG. 3) is obtained. The content of platinum catalyst in the gas diffusion electrode 13 is about 1.0 mg/cm².

Then, one sheet of the phosphoric-acid-doped asymmetric-structure polybenzimidazole membrane 1 is clipped between two sheets of the gas diffusion electrode 13 to be bonded by hot-pressing under a pressure about 150 kgf/cm² and a temperature of 150° C. for 10 minutes. Thus, a membrane electrode 10 is obtained, whose active area is decided by the area of the gas diffusion electrode. The active area of the membrane electrode for testing is 2.25 cm$^2$.

E. Testing Fuel Cell

The previously fabricated membrane electrode 10, gaskets 20, gas flow path bipolar plates 30 and current collector plates 40 (or end plates) are assembled into a test single fuel cell 100. The structure is shown in FIG. 3, where related components are purchased from HEPHAS Energy Co. Tests of the fuel cell are carried out on a test platform of Tension Energy Co. with its power controller and software. Regarding fuel supply, the anode fuel is high-purity hydrogen and the cathode fuel is high-purity oxygen, where the hydrogen and oxygen flow rates are controlled at 100 ml/min. Before testing the fuel cell, the activation treatment is processed. It means that the test fuel cell is activated for 4~24 hours under a load current density of 0.2 A/cm$^2$ at a temperature of 150° C. with required fuels supplied. Polarization curves obtained through Tafel tests are used to evaluate the best power density and the maximum current density of the fuel cell.

[Test 1]

By following the above instructions, the asymmetric-structure polybenzimidazole membrane is fabricated, where, during fabrication, the solution A contains a 3 wt % solid content of polybenzimidazole and the solution B is added with an ionic liquid whose content is 50 phr relative to the weight of polybenzimidazole. The fabricated asymmetric-structure polybenzimidazole membrane has a porosity of 18.3 vol %, which appears transparent but hazy with a tensile-stress strength about 87 MPa. After being doped with phosphoric acid, the phosphoric-acid-doped asymmetric-structure polybenzimidazole membrane is obtained, whose phosphoric-acid content is 19.3 phosphoric acid molecules per polymer repeating unit and the proton conductivity is 2.6×10$^{-2}$ S/cm. A micro-phase image of the specimen is photographed by a reflection-type electron microscope (SEM) and denoted as (a) in FIG. 4. The membrane electrode is fabricated through hot-pressing for assembling a test single cell fuel. By smoothly operating the test single cell fuel, the Tafel test result shows that the maximum power density is about 225 mW/cm$^2$ and the maximum current density is about 900 mA/cm$^2$.

[Test 2]

By following the above instructions, the asymmetric-structure polybenzimidazole membrane is fabricated, where, during fabrication, the solution A contains a 3 wt % solid content of polybenzimidazole and the solution B is added with an ionic liquid whose content is 75 phr relative to the weight of polybenzimidazole. The fabricated asymmetric-structure polybenzimidazole membrane has a porosity of 36.3 vol %, which appears opaque with a tensile-stress strength about 77 MPa. After being doped with phosphoric acid, the phosphoric-acid-doped asymmetric-structure polybenzimidazole membrane is obtained, whose phosphoric-acid content is 21.9 phosphoric acid molecules per polymer repeating unit and the proton conductivity is 3.1×10$^{-2}$ S/cm. A micro-phase image of the specimen is photographed by a reflection-type SEM and denoted as (b) in FIG. 4. The membrane electrode is fabricated through hot-pressing for assembling a test single cell fuel. By smoothly operating the test single cell fuel, the Tafel test result shows that the maximum power density is about 240 mW/cm$^2$ and the maximum current density is about 900 mA/cm$^2$.

[Test 3]

By following the above instructions, the asymmetric-structure polybenzimidazole membrane is fabricated, where, during fabrication, the solution A contains a 3 wt % solid content of polybenzimidazole and the solution B is added with an ionic liquid whose content is 100 phr relative to the weight of polybenzimidazole. The fabricated asymmetric-structure polybenzimidazole membrane has a porosity of 57.1 vol %, which appears opaque with a tensile-stress strength about 62 MPa. After being doped with phosphoric acid, the phosphoric-acid-doped asymmetric-structure polybenzimidazole membrane is obtained, whose phosphoric-acid content is 23.3 phosphoric acid molecules per polymer repeating unit and the proton conductivity is 6.6×10$^{-2}$ S/cm. A micro-phase image of the specimen is photographed by a reflection-type SEM and denoted as (c) in FIG. 4. The membrane electrode is fabricated through hot-pressing for assembling a test single cell fuel. By smoothly operating the test single cell fuel, the Tafel test result shows that the maximum power density is about 270 mW/cm$^2$ and the maximum current density is about 1100 mA/cm$^2$.

[Test 4]

By following the above instructions, the asymmetric-structure polybenzimidazole membrane is fabricated, where, during fabrication, the solution A contains a 3 wt % solid content of polybenzimidazole and the solution B is added with an ionic liquid whose content is 200 phr relative to the weight of polybenzimidazole. The fabricated asymmetric-structure polybenzimidazole membrane has a porosity of 83.1 vol %, which appears opaque with a tensile-stress strength about 47 MPa. After being doped with phosphoric acid, the phosphoric-acid-doped asymmetric-structure polybenzimidazole membrane is obtained, whose phosphoric-acid content is 23.6 phosphoric acid molecules per polymer repeating unit and the proton conductivity is 6.3×10$^{-2}$ S/cm. A micro-phase image of the specimen is photographed by a reflection-type SEM and denoted as (d) in FIG. 4. The membrane electrode is fabricated through hot-pressing for assembling a test single cell fuel. By smoothly operating the test single cell fuel, the Tafel test result shows that the maximum power density is about 295 mW/cm$^2$ and the maximum current density is about 1100 mA/cm$^2$.

[Test 5]

By following the above instructions, the asymmetric-structure polybenzimidazole membrane is fabricated, where, during fabrication, the solution A contains a 3 wt % solid content of polybenzimidazole, the solution B is added with an ionic liquid whose content is 100 phr relative to the weight of polybenzimidazole, and the solution B is further added with a crosslinker of p-xylene dichloride which has a molar ratio relative to polybenzimidazole as 0.25. The fabricated asymmetric-structure polybenzimidazole membrane has a porosity of 19.8 vol %, which appears opaque with a tensile-stress strength about 71 MPa. After being doped with phosphoric acid, the phosphoric-acid-doped asymmetric-structure polybenzimidazole membrane is obtained, whose phosphoric-acid content is 14.9 phosphoric acid molecules per polymer repeating unit and the proton conductivity is 2.5×10$^{-2}$ S/cm. The membrane electrode is fabricated through hot-pressing for assembling a test single cell fuel. By smoothly operating the test single cell fuel, the Tafel test result shows that the maximum power density is about 130 mW/cm$^2$ and the maximum current density is about 400 mA/cm$^2$.

[Comparison 1]

A non-porous-structure polybenzimidazole membrane is fabricated by directly casting a solution A of polybenzimidazole (having 3 wt % solid content) into a mould. The fabricated polybenzimidazole membrane has a porosity of 0 vol %, which appears opaque with a tensile-stress strength about 95 MPa. After being doped with phosphoric acid, the phosphoric-acid-doped asymmetric-structure polybenzimidazole membrane is obtained, whose phosphoric-acid content is 17.4 phosphoric acid molecules per polymer repeating unit and the proton conductivity is $2.1 \times 10^{-2}$ S/cm. The membrane electrode is fabricated through hot-pressing for assembling a test single cell fuel. By smoothly operating the test single cell fuel, the Tafel test result shows that the maximum power density is about 185 mW/cm$^2$ and the maximum current density is about 700 mA/cm$^2$.

Figure 5:
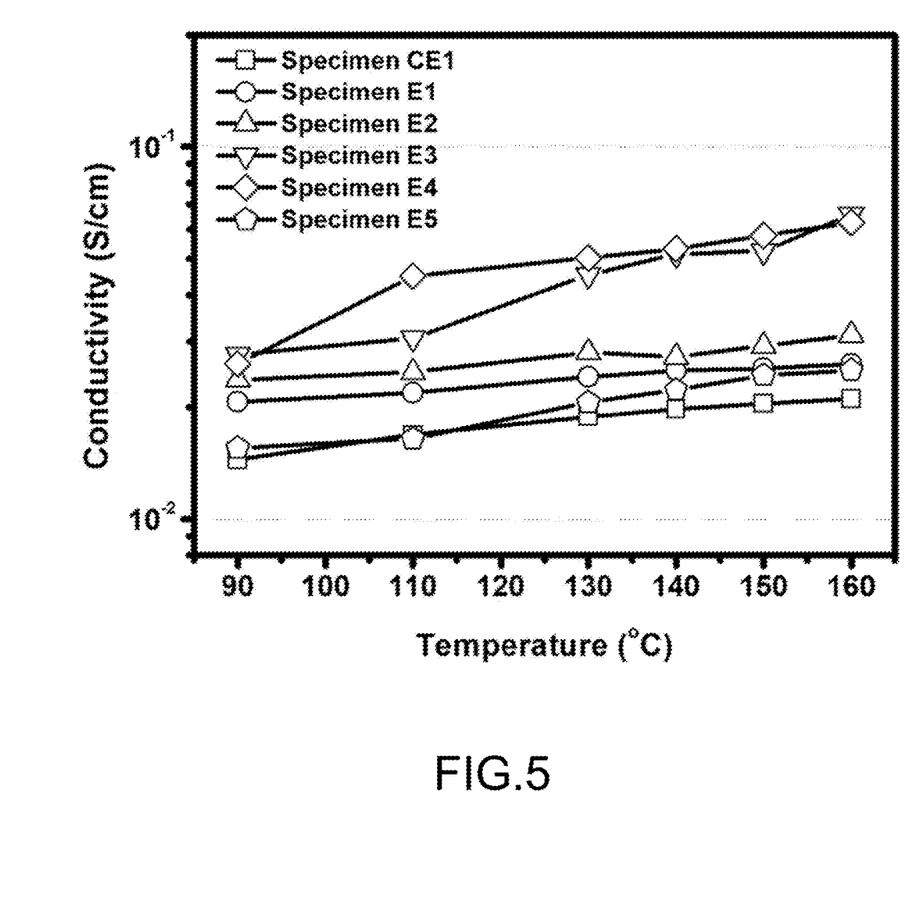
FIG. 5 is the view showing the proton conductivities of the specimens under different temperatures in the anhydrous environment.
Figure 6:
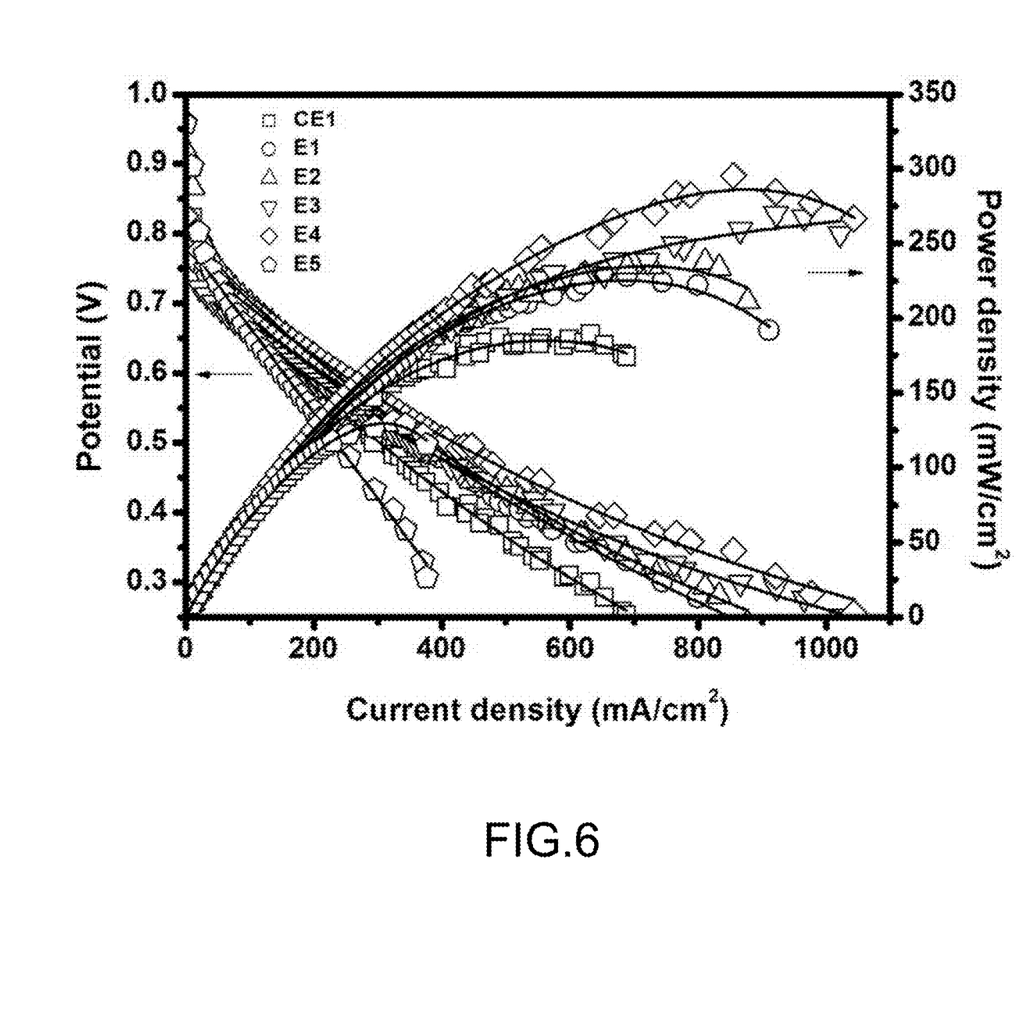
FIG. 6 is the view showing the Tafel test results of the fuel cell using the specimens.

The proton conductivities of the specimens used in Test 1~5 and Comparison 1 under different temperatures in an anhydrous environment are shown in FIG. 5; and Tafel test results of the specimens used in Test 1~5 and Comparison 1 are shown in FIG. 6.

To sum up, the present invention is a method of fabricating a proton-conducting electrolytic membrane, where an asymmetric-structure polybenzimidazole membrane doped with phosphoric acid is fabricated; the polybenzimidazole membrane comprises a dense layer and a porous layer; the phosphoric acid content introduced into the polybenzimidazole membrane is more than 20 phosphoric acid molecules per polymer repeating units; the proton conductivity of the polybenzimidazole membrane reaches more than $5 \times 10^{-2}$/cm; a membrane electrode made with the polybenzimidazole membrane can is used in a high-temperature PEMFC; and problems of fuel crossover and acid leakage are solved to enhance reliability for smoothly operating the PEMFC.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a proton-conducting electrolytic membrane, comprising steps of:
   (a) through a template-leaching method, obtaining an ionic liquid in the form of a salt compound containing imidazolium as a template to be mixed with a polybenzimidazole solution to obtain an asymmetric-structure polybenzimidazole membrane after leaching out a porous layer,
   wherein said ionic liquid and said polybenzimidazole solution are immiscible; and
   (b) through being soaked in phosphoric acid, introducing phosphoric acid into said polybenzimidazole membrane to obtain a proton-conducting electrolytic membrane,
   wherein step (a) comprises the following steps:
      said polybenzimidazole solution and said ionic liquid are mixed with a first organic solvent; said first organic solvent simultaneously dissolves said polybenzimidazole solution and said ionic liquid to obtain a mixture; said first organic solvent is removed to obtain a solid membrane with said polybenzimidazole solution and said ionic liquid; said solid membrane is soaked in a second organic solvent; said second organic solvent dissolves said polybenzimidazole solution but not said ionic liquid so that said ionic liquid is extracted from said solid membrane to be filtered off; and said solid membrane is hot-dried to remove excess solvent to obtain said asymmetric-structure polybenzimidazole membrane,
   wherein, said first organic solvent is selected from a group consisting of dimethylacetamide (DMAc), N-Methyl-2-pyrrolidone (NMP), dimethyl-formamide (DMF), dimethyl sulfoxide (DMSO) and m-cresol; and said second organic solvent is selected from a group consisting of methanol and ethanol.

2. The method according to claim 1,
   wherein step (b) comprises the following steps:
      said asymmetric-structure polybenzimidazole membrane is soaked in an aqueous phosphoric-acid solution having high concentration; after being soaked until said polybenzimidazole membrane is not increased in weight, a content of phosphoric acid thus introduced is saturated and residual part of said phosphoric-acid solution on surface of said polybenzimidazole membrane is wiped off; and said polybenzimidazole membrane is hot-dried to remove residual water to obtain said proton-conducting electrolytic membrane,
   wherein said aqueous phosphoric-acid solution has a concentration at least 11 molars (M).

3. The method according to claim 1,
   wherein said ionic liquid has a weight ratio of content at least 50 phr relative to that of said polybenzimidazole solution.

4. The method according to claim 1,
   wherein said asymmetric-structure polybenzimidazole membrane comprises a dense layer and a porous layer; and said dense layer and said porous layer have the same main material of polybenzimidazole.

5. The method according to claim 4,
   wherein said material of polybenzimidazole is obtained through condensation polymerization with benzene-ring structured di-acid and benzene-ring structured tetra-amine.

6. The method according to claim 1,
   wherein said asymmetric-structure polybenzimidazole membrane together with gas diffusion electrodes is processed through hot-pressing to obtain a membrane electrode used in a high-temperature proton exchange membrane fuel cell (PEMFC).

7. The method according to claim 6,
   wherein said gas diffusion electrode is a carbon substrate; and said carbon substrate is coated with a catalyst on surface and has a hydrophobic microporous layer.

* * * * *